UNITED STATES PATENT OFFICE.

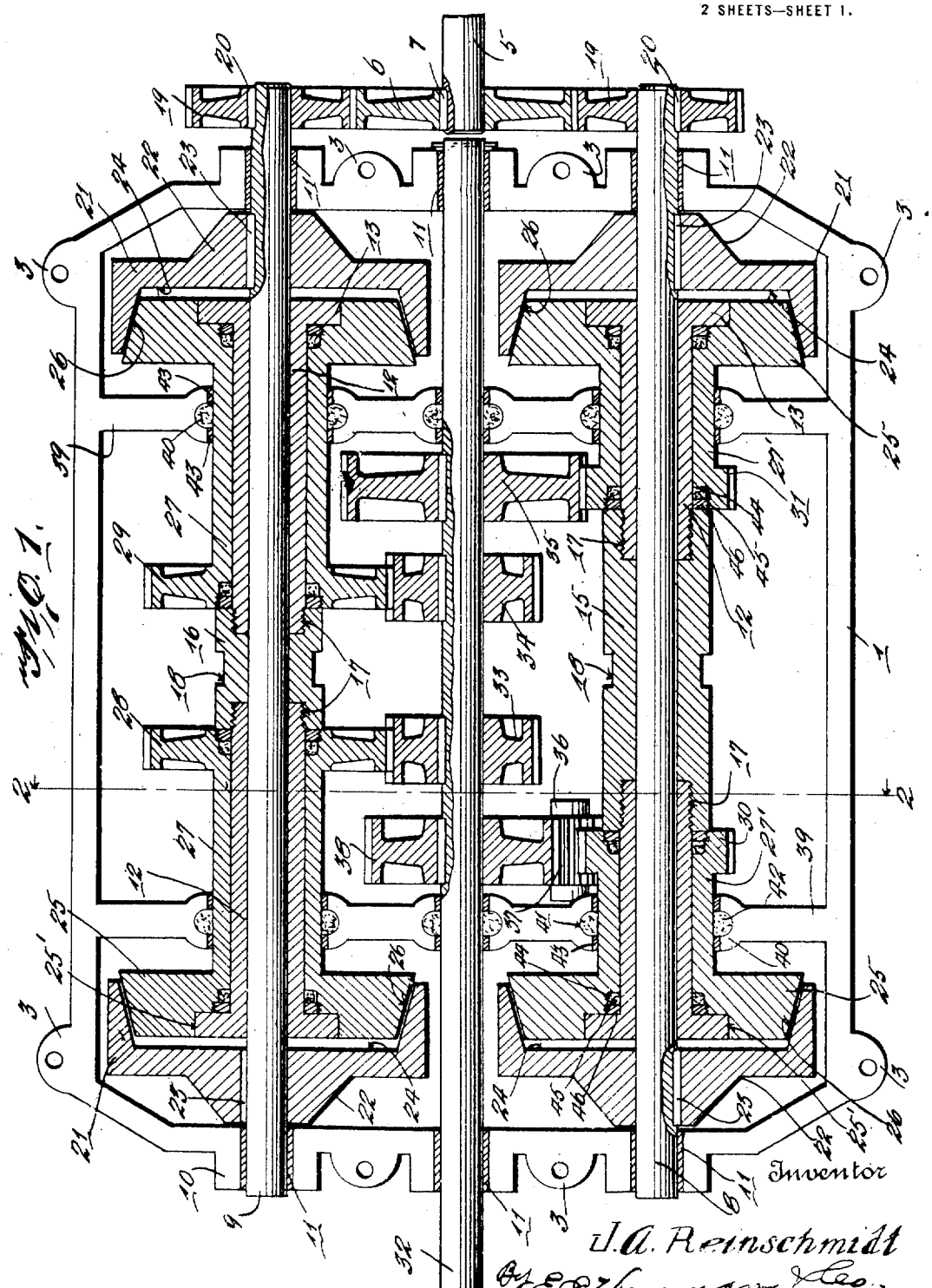

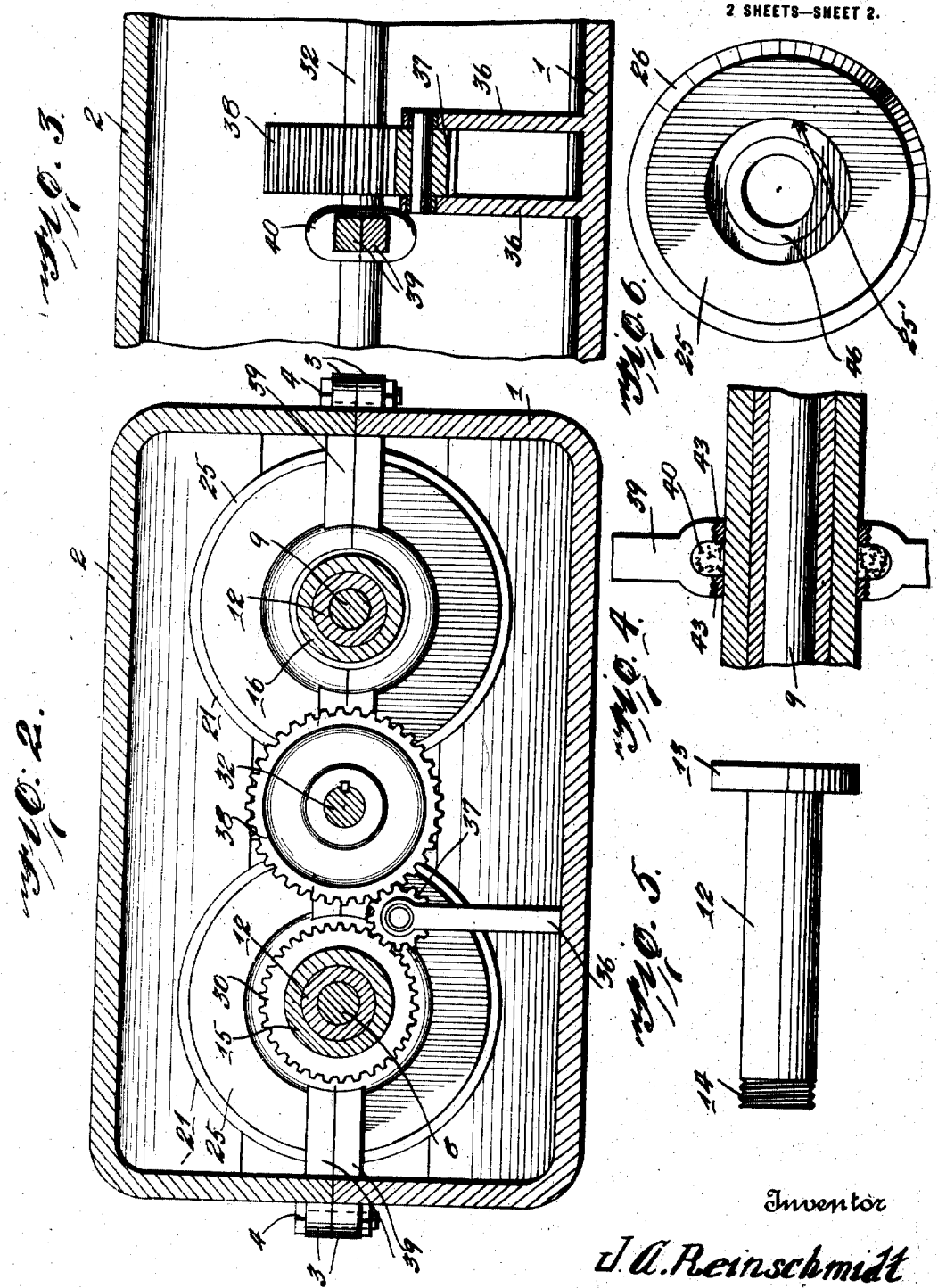

JOHN A. REINSCHMIDT, OF BLUNT, SOUTH DAKOTA.

AUTOMOBILE TRANSMISSION MECHANISM.

1,251,418.	Specification of Letters Patent.	Patented Dec. 25, 1917.

Application filed May 22, 1917. Serial No. 170,245.

*To all whom it may concern:*

Be it known that I, JOHN A. REINSCHMIDT, a citizen of the United States of America, residing at Blunt, in the county of Hughes and State of South Dakota, have invented certain new and useful Improvements in Automobile Transmission Mechanism, of which the following is a specification, reference being had therein to the accompanying drawing.

This invention relates to an automobile transmission mechanism and has for its principal object the production of a device which is adapted to impart rotary motion to the axle shaft at various speeds.

Another object of this invention is the production of an automobile transmission mechanism which is constructed so as to impart rotary motion to the axle shaft at various speeds in such a manner as to prevent the stripping of the gears.

A still further object of this invention is the production of an automobile transmission mechanism which is provided with cone blocks and clutch cones arranged so as to be intermittently moved into engagement with each other as desired, thus imparting rotary motion to the various elements for causing the axle shaft to be rotated at a desired speed.

A still further object of this invention is the production of an automobile transmission mechanism which has a plurality of cone clutches and cone blocks arranged so as to permit a desired cone clutch and block to be moved into engagement with each other, thus imparting rotary motion to a plurality of gears for rotating the axle shaft at a desired speed while simple and efficient means is provided for positively causing the clutches and blocks to be moved into or out of engagement with each other.

With these and other objects in view, this invention consists in general of certain novel combinations, constructions and arrangements of parts as will be hereinafter fully described and claimed.

In the accompanying drawings:—

Figure 1 is a longitudinal section through the automobile transmission mechanism, one section of the housing being removed.

Fig. 2 is a vertical section taken on the line 2—2, Fig. 1, looking in the direction of the arrows.

Fig. 3 is an enlarged fragmentary sectional view through a portion of the device, illustrating the manner in which a certain reversing pinion is supported.

Fig. 4 is a section taken through one of the sleeves of a cone block and the various elements engaging the same and also supporting the same.

Fig. 5 is a side elevation of a certain tube connection used in the present invention.

Fig. 6 is an elevation of the outer end of one of the cone blocks.

Referring to the accompanying drawings by numerals, it will be seen that 1 comprises the lower section of the casing and 2 the upper section thereof. These sections 1 and 2 are adapted to be positioned upon each other, as shown in Fig. 2, so as to permit the ears 3 thereof to engage each other, thus permitting bolts 4 to be passed through the ears for securing the two sections together in the usual manner.

The drive shaft 5 which is connected to an engine in any suitable manner is provided with a gear 6 keyed thereto, as shown at 7, whereby as rotary motion is imparted to the draft shaft 5, the gear 6 will in turn be rotated.

The auxiliary drive shafts 8 and 9 are carried by the casing, as shown clearly in Figs. 1 and 2, and project entirely through the casing so as to have their ends journaled in the bearings 10 of the casing. It is, of course, obvious that suitable packing elements 11 may be positioned within the bearings 10 and engage the end portions of the auxiliary drive shafts 8 and 9 in the usual manner.

Tubes 12 are positioned upon the auxiliary drive shafts 8 and 9 and each tube 12 has an annular flange 13 formed at one end thereof, while at the opposite end of each tube there is formed an externally-threaded portion 14. It will be noted that a pair of tubes 12 are positioned upon each drive shaft, as shown in Fig. 1, while the externally-threaded ends 14 of the tubes will be projecting toward each other while the flanges 13 of these tubes will be extending toward the ends of the auxiliary drive shafts 8 and 9. The externally-threaded ends 14 of the tubes 12 are connected together by couplings 15 and 16. It will be noted that the coupling 15 is considerably longer than the coupling 16 inasmuch as the coupling 16 must be short enough to provide for the positioning of certain pinions, to be hereinafter described, in such a manner as to efficiently operate. It will be noted that the couplings 15 and 16 are provided with internally-threaded sockets 17 in their ends, so as to permit the couplings 15 to be threaded into engagement with the threaded ends 14 of the tubes 12, thereby causing the tubes and coupling upon each auxiliary drive shaft to be moved as a unit. It is, of course, obvious that each coupling may be provided with an annular groove 18 to be engaged by any suitable lever or yoke connection, not deemed necessary to be shown, for the purpose of shifting the shifting frame formed by the tubes and coupling upon each shaft toward either end of the particular auxiliary drive shaft upon which the same is supported.

Gears 19 are keyed, as indicated at 20, upon projecting ends of the auxiliary drive shafts 8 and 9 and these gears 19 mesh with the gear 6 keyed to the drive shaft 5 so that when the drive shaft 5 is being rotated by the engine, rotary motion will be imparted through the gears 19 to the auxiliary drive shafts 8 and 9.

The cone clutches 21 have enlarged heads 22 keyed, as shown at 23, to the auxiliary drive shafts 8 and 9. The cone clutches 21 have enlarged pockets 24 formed in their inner faces and the circumference of each pocket 24 diminishes toward the inner portion of the pocket so as to cause the entrance to the pocket to be greater in diameter than the diameter of the pocket at its inner portion. The cone clutches 21 are carried adjacent the end portions of the auxiliary drive shafts 8 and 9 and the heads of these cone clutches project toward the ends of the auxiliary drive shafts, thereby causing the pockets formed in the clutches to be in alinement with each other, and directed toward the inner portions of the casing. It will be noted by referring particularly to Fig. 1 that the cone clutches are carried upon the auxiliary drive shafts so as to cause the ends of the shifting frames formed by the tubes and couplings hereinbefore described to project into the pockets, although the flanges 13 of the tubes 12 will be spaced from the inner surface of the pockets. Since the auxiliary drive shafts 8 will be rotating in unison with the main shaft 5, and since the cone clutches are fixedly secured in set positions upon the auxiliary drive shafts, it is obvious that the cone clutches will also rotate in unison with the movement of the shaft 5.

The cone blocks 25 have their peripheries 26 beveled so as to slant toward the outer sides of the blocks as illustrated in Fig. 1. Sleeves 27 and 27' are formed upon the cone blocks and project therefrom, although it will be noted that the sleeves 27 are considerably longer than the sleeves 27'. These sleeves 27 and 27' bear upon the tubes 12 and as these sleeves 27 are loosely mounted upon the tubes 12, it is obvious the sleeves 27 may be rotated without imparting rotary movement to the tubes of the shifting frames. Pinions 28 and 29 are formed upon the inner ends of the sleeves 27, while pinions 30 and 31 are formed upon the inner ends of the sleeves 27'. It will be noted that the pinions 28, 29, 30 and 31 are arranged so as to be in positions adjacent the ends of the couplings 15 and 16, while the flanges 13 of the tubes 12 will fit within the annular sockets 25' formed in the outer faces of the clutch blocks 25. As a consequence, when the shifting frames are moved along the auxiliary drive shafts in either direction, the cone blocks carried upon the respective frames will also be moved owing to the engagement of the cone blocks and the flanges and the couplings and pinions.

The axle shaft 32 is carried by the casing and projects entirely therethrough, but this axle shaft 32 is not connected with the drive shaft 5. Pinions 33 and 34 and 35 are keyed upon the axle shaft 32 at spaced intervals with respect to each other and in such manner as to permit the pinions 33 to mesh with the pinion 28, and the pinion 34 to mesh with the pinion 29, while the pinion 35 will mesh with the pinion 31.

A pair of standards 36 are carried by the section of the casing and these standards 36 have a reduced pinion 37 rotatably mounted adjacent their upper ends. This reduced pinion 37 meshes with the pinion 30 and the pinion 38 keyed upon the axle shaft 32.

The bars 39 are formed upon and are permanently carried by the casing and these bars 39 are provided with housing portions 40 which surround the sleeves of the clutch blocks as shown clearly in Figs. 1 and 4. These housings 40 are provided with annular grooves 41 formed in their inner portions, whereby oil packing or the like, as shown at 42, may be positioned within these annular grooves 41 for constituting a lubricant for the sleeves. The bars 43 may be carried in any suitable manner by the housings so as to fit upon the sleeves and prevent the creeping of oil therealong. In order also to prevent the oil from creeping along various other portions of the device, it will be noted that the clutch blocks 25 are provided with internal grooves 44 adapted to receive packing 45 and this packing 45 is retained in position by a washer 46 screwed into the clutch block. In this manner, it will be seen that although lubricant may be freely applied to the tubes and the shifting frames in order to reduce friction between the sleeves and the tubes, it will be impossible for oil to creep along the tubes in such a position as will cause the outer peripheries of the clutch blocks to be greased or lubricated.

It is intended to thoroughly lubricate all the elements of this device so as to reduce friction, with the exception of the interior of the pockets of the clutch cones and the outer peripheries of the clutch blocks.

When this device is in operation and rotary motion is being imparted from the drive shaft 5 through the gears 6 and 19 to the auxiliary drive shafts 8 and 9, it is obvious as has hereinbefore been explained that the clutch cones will be rotating in unison with these auxiliary drive shafts. As the structure is shown in Fig. 1, it will be seen that all of the clutch blocks are free from engagement with the clutch cones and that the structure is, therefore, in a neutral position.

If it is desired to impart rotary motion to the axle shaft 31 at the lowest speed, the shifting frame carried upon the auxiliary drive shaft 8 is shifted toward the right so as to cause the cone block carried at the right end of the shifting frame to be brought into a wedging engagement with the respective clutch cone. At this time, the clutch cone will be rotating by the movement of the auxiliary drive shaft 8 and, as is obvious, rotary motion will be imparted to the cone block and through this cone block and sleeve to the gear 31. From this gear rotary motion is imparted through the gear 35 to the axle shaft 32, thus causing the automobile upon which the transmission is carried to be driven at the minimum speed.

When it is desired to increase the speed of the axle shaft 32, the shifting frame carried upon the auxiliary drive shaft 8 is moved to a central position for causing the clutch cones mounted thereon to be disengaged by the cone blocks. After this operation has taken place, it is obvious that the shifting frame mounted upon the auxiliary drive shaft 9 will be shifted toward the end of the auxiliary drive shaft 9 upon which the gear 19 is carried, thus causing an engagement between the cone block and the cone clutch for imparting rotary motion through the sleeve 27 to the gear 29, and thence through the gear 34 to the axle shaft 32. A higher speed is obtained by the movement of the shifting frame for causing the disengagement of the cone block and cone clutch adjacent the end of the auxiliary drive shaft 9 upon which the gear 19 is carried, and the movement of the cone block into engagement with the cone clutch adjacent the opposite end of the auxiliary drive shaft. This will cause rotary motion to be imparted through the sleeve 27 to the pinion 28 and thence through the pinion 33 to the axle shaft 32 for rotating the axle shaft 32 at its greatest speed.

If it is desired to reverse the movement of the automobile and the transmission is at a neutral position as shown in Fig. 1, the shifting frame mounted upon the auxiliary drive shaft 8 may be moved away from the end upon which the gear 19 is mounted. This action will cause the cone block and cone clutch to be moved into engagement at the free end of the auxiliary drive shaft, thus imparting rotary motion through one of the sleeves 27' to the pinion 32. As this pinion 30 meshes with the reduced pinion 37 it is obvious that the pinion 37 will be rotated, and since this pinion 37 meshes with the pinion 38, rotary motion in the opposite direction will be imparted to the axle shaft 32.

From the foregoing description it will be seen that a very efficient automobile transmission has been produced which permits the drive shaft and the auxiliary drive shafts to be rotated at one speed when the engine is in operation and at the same time allow certain of the pinions to be moved into operative positions, thus imparting rotary motion to the axle shaft 32 of a desired speed without necessitating the slowing action of the gears or without danger of stripping the gears or pinions. It will further be seen that since the shifting frames are movably mounted upon the auxiliary drive shafts, they may be moved in either direction very easily so as to move at one time one of the clutch blocks into engagement with one of the clutch cones and at the same time moving the remaining cone block away from the remaining cone clutch.

It will further be seen that very efficient means is provided for lubricating the various revolving elements of the transmission without allowing lubricant to be directed upon the periphery of the clutch blocks or the interior of the cone clutches.

It is, of course, obvious that many minor detail changes may be made in the mechanical construction of this device, without departing from the spirit of the invention, and, therefore, it is not desired to confine the present invention to the specific structure as herein disclosed, but to include all such forms of the invention as properly come within the scope thereof as claimed.

What is claimed is:—

1. In an automobile transmission mechanism of the class described, the combination of a drive shaft, an auxiliary drive shaft, an axle shaft, means for imparting rotary motion from said drive shaft to said auxiliary drive shaft, clutches carried upon said auxiliary drive shaft, pinions connected to said clutches, pinions mounted upon said axle shaft and meshing with said first-mentioned pinions, means for moving said clutches into operative or inoperative positions whereby rotary motion may be imparted through said first-mentioned pinions to said last-mentioned pinions and thence to said axle shaft.

2. In an automobile transmission mechanism of the class described, the combination of a drive shaft, an axle shaft, an auxiliary drive shaft, means for imparting rotary motion from said drive shaft to said auxiliary drive shaft, a shifting frame carried upon said auxiliary drive shaft, a clutch mechanism mounted upon said shifting frame and said auxiliary drive shaft whereby said shifting frame may move said clutch mechanism into an operative or inoperative position, pinions connected to said clutch mechanism, pinions keyed upon said axle shaft whereby when said clutch mechanism is moved into an operative position rotary motion will be imparted through said pinions to said axle shaft.

3. In an automobile transmission mechanism of the class described, the combination of a drive shaft, an auxiliary drive shaft, means for imparting rotary motion from said drive shaft to said auxiliary drive shaft, an axle shaft, cone clutches permanently secured upon said auxiliary drive shaft, a shifting frame slidably mounted upon said auxiliary drive shaft, cone blocks rotatably mounted upon said shifting frame, pinions connected to said cone blocks, said shifting frame being adapted to move one block into engagement with a desired cone clutch at a single time whereby rotary motion will be imparted to said pinion, and a pinion keyed upon said axle shaft and meshing with said first-mentioned pinion whereby when said first-mentioned pinion is rotated rotary motion will be imparted through said last-mentioned pinion to said axle shaft.

4. In an automobile transmission mechanism of the class described, the combination of a drive shaft, an auxiliary drive shaft, means for imparting rotary motion from said drive shaft to said auxiliary drive shaft, an axle shaft, a shifting frame slidably mounted upon said auxiliary drive shaft, said shifting frame comprising a pair of tubes, a coupling connecting the inner ends of said tubes, flanges formed upon the outer ends of said tubes, clutch blocks positioned upon said tubes and said flanges, sleeves extending from said blocks, pinions carried upon the inner ends of said sleeves, said sleeves being adapted to freely rotate upon said tubes, said flanges being adapted to move said clutch blocks as said shifting frame is moved, cone clutch members fixedly mounted upon said auxiliary drive shaft adjacent said blocks whereby when so desired a block may be moved into engagement with one of the cone clutch members, thereby causing rotary motion to be imparted through one of said blocks and sleeves to one of said pinions, pinions keyed upon said axle shaft and meshing with said first-mentioned pinions whereby when one of said first-mentioned pinions is being rotated rotary motion will be imparted through one of said last-mentioned pinions to said axle shaft.

5. In an automobile transmission mechanism of the class described, the combination of a drive shaft, an auxiliary drive shaft, means for imparting rotary motion from said drive shaft to said auxiliary drive shaft, an axle shaft, a shifting frame mounted upon said auxiliary drive shaft, cone clutches fixedly mounted upon said auxiliary drive shaft adjacent the ends of said shifting frame, sleeves rotatably mounted upon said shifting frame, clutch blocks formed upon said sleeves, pinions formed upon said sleeves, pinions keyed upon said axle shaft and meshing with said first-mentioned pinions, said frame being adapted to be shifted so as to move one of said blocks into engagement with one of said cone clutches whereby rotary motion will be imparted through said pinions to said axle shaft.

6. In an automobile transmission mechanism of the class described, the combination of a drive shaft, an auxiliary drive shaft, means for imparting rotary motion from said drive shaft to said auxiliary drive shaft, an axle shaft, a clutch mechanism carried upon said auxiliary drive shaft, a pinion carried by said clutch mechanism, standards carried adjacent said auxiliary drive shaft, a reduced pinion carried upon said standards and meshing with said first-mentioned pinion, a pinion keyed upon said axle shaft and meshing with said reduced pinion whereby rotary motion may be imparted through said pinions to said drive axle shaft.

7. In an automobile transmission mechanism of the class described, the combination of a casing having a plurality of bars, said bars having housings formed thereon intermediate their ends, said housings having internal grooves, packing carried within said grooves, burs carried by said housings adjacent said grooves, shafts projecting through said housings whereby said shafts may be lubricated without danger of the lubricant creeping along said shafts, and means for imparting rotary motion to said shafts.

In testimony whereof I hereunto affix my signature.

JOHN A. REINSCHMIDT.